(12) United States Patent
Gabriel et al.

(10) Patent No.: US 10,536,270 B2
(45) Date of Patent: Jan. 14, 2020

(54) MESSAGE MANAGEMENT

(71) Applicants: Michael Richard Gabriel, Portola Valley, CA (US); Glenn Carter Scott, Portola Valley, CA (US)

(72) Inventors: Michael Richard Gabriel, Portola Valley, CA (US); Glenn Carter Scott, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 111 days.

(21) Appl. No.: 15/942,347

(22) Filed: Mar. 30, 2018

(65) Prior Publication Data

US 2019/0305944 A1 Oct. 3, 2019

(51) Int. Cl.
*H04L 9/08* (2006.01)
*H04L 29/06* (2006.01)
*H04L 29/08* (2006.01)

(52) U.S. Cl.
CPC ........ *H04L 9/0861* (2013.01); *H04L 63/0428* (2013.01); *H04L 63/1466* (2013.01); *H04L 69/324* (2013.01)

(58) Field of Classification Search
CPC . H04L 9/0861; H04L 63/0428; H04L 69/324; H04L 63/1466
USPC ........................................................ 713/160
See application file for complete search history.

(56) References Cited

U.S. PATENT DOCUMENTS

| | | | | |
|---|---|---|---|---|
| 7,167,762 B2* | 1/2007 | Glanzer | ................... | G05B 9/02 700/18 |
| 7,313,816 B2* | 12/2007 | Sinha | .................. | H04L 63/0428 713/168 |
| 2003/0115341 A1* | 6/2003 | Sinha | .................. | H04L 63/0428 709/229 |
| 2006/0025872 A1* | 2/2006 | Glanzer | ................... | G05B 9/02 700/21 |
| 2010/0125744 A1* | 5/2010 | Hong | ..................... | H04L 67/24 713/323 |

* cited by examiner

*Primary Examiner* — Teshome Hailu
(74) *Attorney, Agent, or Firm* — Ferguson Braswell Fraser Kubasta PC

(57) ABSTRACT

A method for message management is disclosed. The method includes: deriving, by a first subscriber node (SN), a secret value associated with a publisher node (PN); generating, by the first SN, a first expected sequence number using a one-way function and the secret value; receiving, by the first SN, a first publisher message generated by the PN and including a first sequence number; validating, by the first SN, the first publisher message by comparing the first sequence number with the first expected sequence number; processing, by the first SN, a payload of the first publisher message in response to the first sequence number and the first expected sequence number matching; and generating, by the first SN node, a second expected sequence number using the one-way function, the first sequence number, and the secret value.

17 Claims, 11 Drawing Sheets

MESSAGE MANAGEMENT

BACKGROUND

Computing devices, networking devices, and even software modules often need to exchange messages in order to execute functions. Both the content of the messages (e.g., payload) and the order in which the messages are received are important in correctly executing these functions.

SUMMARY

In general, in one aspect, the invention relates to a method. The method comprises: deriving, by a first subscriber node (SN), a secret value associated with a publisher node (PN); generating, by the first SN, a first expected sequence number using a one-way function and the secret value; receiving, by the first SN, a first publisher message generated by the PN and comprising a first sequence number; validating, by the first SN, the first publisher message by comparing the first sequence number with the first expected sequence number; processing, by the first SN, a payload of the first publisher message in response to the first sequence number and the first expected sequence number matching; and generating, by the first SN node, a second expected sequence number using the one-way function, the first sequence number, and the secret value.

In general, in one aspect, the invention relates to a method. The method comprises: deriving, by a publisher node (PN), a secret value associated with a plurality of subscriber nodes (SNs) and a generation identifier; broadcasting, to the plurality of SNs, a first publisher message comprising the generation identifier and a first sequence number; broadcasting, to the plurality of SNs, a second publisher message comprising the generation identifier and a second sequence number generated using a one-way function, the first sequence number, and the secret value; receiving, by the PN and from a SN of the plurality of SN, a subscriber replay message comprising the generation identifier and a third sequence number corresponding to a third publisher message, wherein the third publisher message was previously broadcasted by the PN; determining, by the PN, a set of publisher messages previously broadcasted by the PN after the third publisher message; and broadcasting, to the plurality of SNs, a set of publisher replay messages corresponding to the set of publisher messages.

In general, in one aspect, the invention relates to a system. The system comprises: a subscriber repository storing: a secret value associated with a publisher node (PN); and a last received sequence number of a first subscriber node (SN); a subscriber transceiver coupled to the subscriber repository and configured to: generate a first expected sequence number using a one-way function and the secret value; receive a first publisher message generated by the PN and comprising a first sequence number; validate the first publisher message by comparing the first sequence number with the first expected sequence number; storing the first sequence number as the last received sequence number in the subscriber repository; and generating a second expected sequence number using the one-way function, the first sequence number, and the secret value; and a subscriber message processor configured to process a payload of the first publisher message in response to the first sequence number and the first expected sequence number matching, wherein the subscriber repository, the subscriber transceiver, and the subscriber message processor are located within the first SN.

Other aspects of the embodiments will be apparent from the following description and the appended claims.

DETAILED DESCRIPTION

Figure 1:
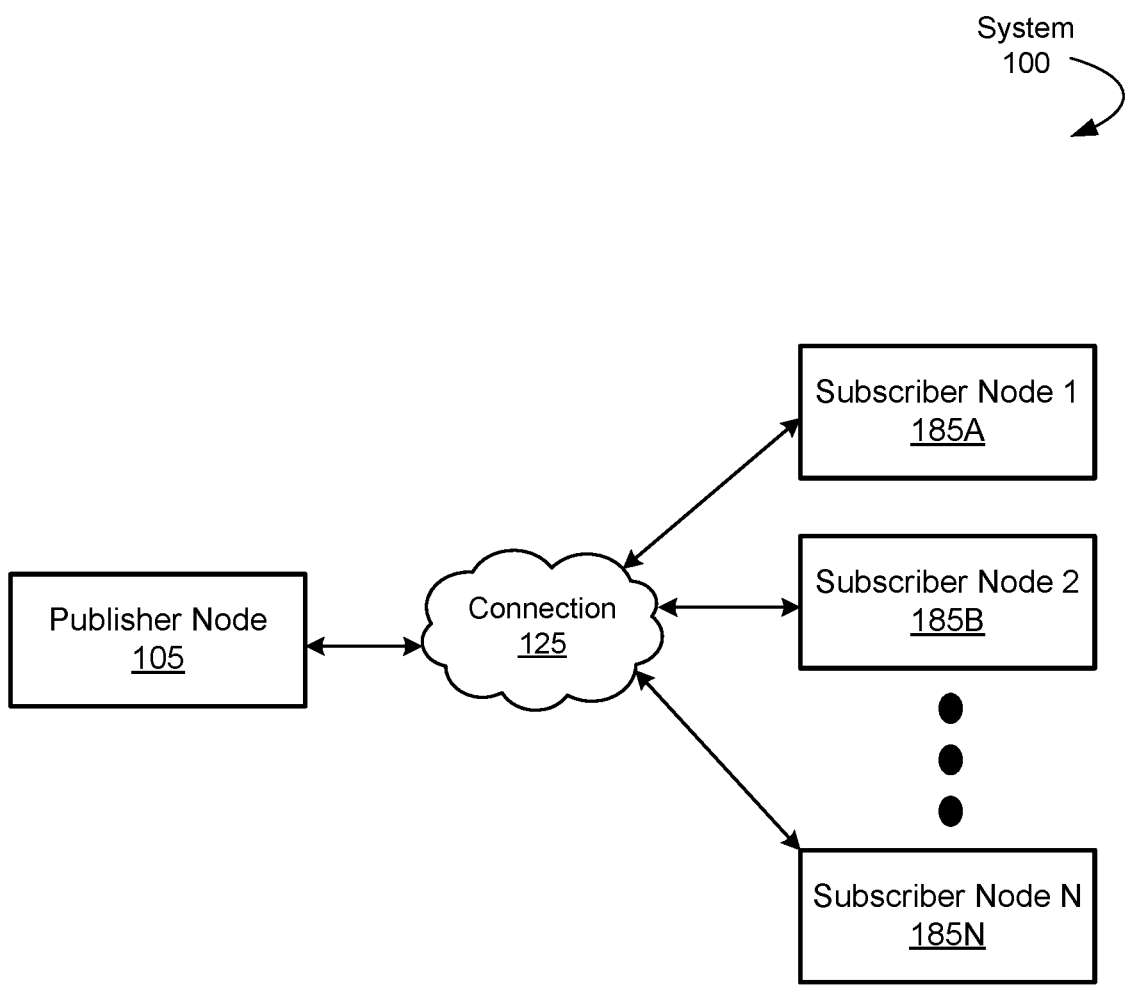
FIG. 1 shows a system in accordance with one or more embodiments of the present disclosure.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may succeed (or precede) the second element in an ordering of elements.

One or more embodiments of the present disclosure are directed to a method and system for generating sequence numbers that are unpredictable to unauthorized third-parties. A current sequence number may be generated using a one-way function (i.e., a function that is impossible or at least very difficult to reverse). The one-way function takes, as inputs, at least a secret value known only to authorized nodes and the previous sequence number. The output of the one-way function is the current sequence number. In order for a message to be accepted by the receiver (e.g., subscriber node), the message should include the current sequence number. Accordingly, if the current sequence number cannot be generated by an unauthorized third-party (e.g., a third-party attempting to act as the publisher node and fool subscriber nodes), the unauthorized third-party cannot send a message that will be accepted by the receiver (e.g., subscriber node). This improves the security of the messaging system.

One or more embodiments of the present disclosure are directed to a method and system for identifying when a message has been dropped (e.g., lost) by a connection (e.g., the Internet) linking a publisher node with one or more subscriber nodes. Each message broadcasted by the publisher node may include a sequence number. Further, a subscribe node can calculate the expected sequence number of the next message expected to arrive at the subscriber node. When the receiver node finally receives the message but the sequence number in the message does not match the expected sequence number calculated by the subscriber node, this indicates that at least one message has been dropped. In other words, a dropped message can be identified as soon as a message with an unexpected sequence number arrives at the subscriber node. In response, the subscriber node can send a subscriber replay message to the publisher node indicating a message is dropped. If many subscriber replay messages are received by the publisher node, this is an indication to the publisher node that current connection is poor and the publisher node should attempt a new/alternate connection with the subscriber nodes and/or wait a pre-determined time before broadcasting any additional messages.

One or more embodiments of the present disclosure are directed towards one or more subscriber nodes receiving publisher messages that have been broadcasted by a publisher node. Each publisher message includes a sequence number that may be generated using a one-way function (e.g., a hash function), a secret value, and the previous sequence number. Similarly, each subscriber node may calculate the expected sequence number of the next publisher message. A subscriber node is able to determine that a publisher message has been dropped (e.g., by the connection linking the publisher node and the subscriber nodes) or an unauthorized third party is engaging in spoofing (e.g., the unauthorized third party is pretending to be the publisher node and attempting to fool the subscriber nodes) when there is a mismatch between the expected sequence number and the actual sequence number in the next received publisher message.

One or more embodiments of the present disclosure are directed towards a publisher node receiving a subscriber replay message from a subscriber node. The subscriber replay message is sent in response to the subscriber node determining at least one publisher message has been dropped. The subscriber replay message includes the last received sequence number of the subscriber node. In response to the subscriber replay message, the publisher node broadcasts publisher replay messages corresponding to all publisher messages having sequence numbers ordered after the last received sequence number in the subscriber replay message.

FIG. 1 shows a system (100) in accordance with one or more embodiments of the present disclosure. As shown in FIG. 1, the system (100) has multiple components including a publisher node (105) and one or more subscriber nodes (i.e., subscriber node 1 (185A), subscriber node 2 (185B), and subscriber node N (185N)). The publisher node (105) and each subscriber node (185A, 185B, 185N) may correspond to an physical or virtual computing device (e.g., personal computer (PC), tablet PC, server, smart phone, kiosk, etc.) or a networking device (e.g., switch, router, network interface card, etc.). Additionally or alternatively, publisher node (105) and each subscriber node (185A, 185B, 185N) may correspond to software modules executing on one or more computing devices.

Still referring to FIG. 1, the publisher node (105) and the subscriber nodes (185A, 185B, 185N) are linked by the connection (125). The connection (125) may correspond to a network of any size including wired and/or wireless segments (e.g., a local area network (LAN), the Internet, cellular network, etc.). Additionally or alternatively, the connection (125) may correspond to a bus on a single computing device.

In one or more embodiments, the publisher node (105) and the subscriber nodes (185A, 185B, 185N) exchange messages via the connection (125). These messages may be transmitted by the publisher node and/or subscriber node to invoke execution of a function or continue execution of a function. Both the content of the messages (e.g., payload) and the order of the messages are important in correctly executing the function. For example, the payload may identify the function that should be executed and/or parameters that should be used to execute the function. As another example, to accomplish a task correctly, function A to be executed before function B. Accordingly, the message to invoke execution of function A should be ordered before the message to invoke execution of function B. New subscriber nodes (not shown) may join the system (100) at any time. Existing subscriber nodes (185A, 185B, 185N) may leave the system (100) at any time.

Figure 2A:
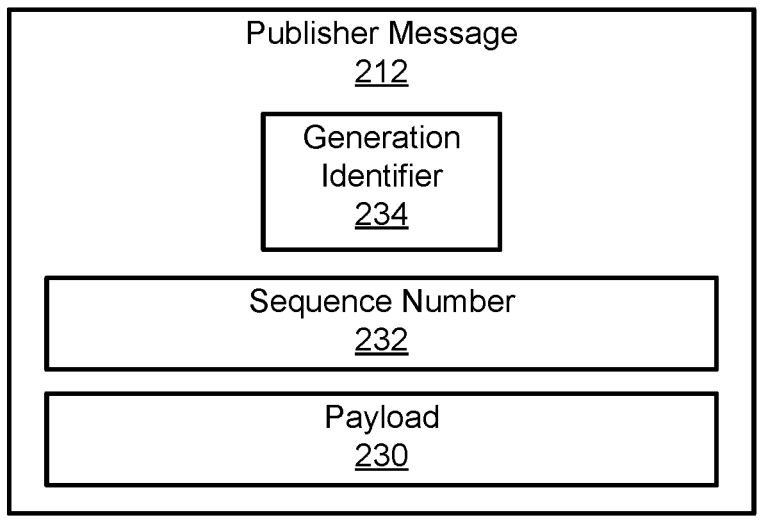
FIGS. 2A, 2B, 2C, 2D shows messages in accordance with one or more embodiments of the present disclosure.

FIG. 2A shows a publisher message (212) in accordance with one or more embodiments of the present disclosure. The publisher message (212) is broadcasted by the publisher node (105) to the subscriber nodes (185A, 185B, 185N) via the connection (125). As shown in FIG. 2A, the publisher message (212) includes a generation identifier (234), a sequence number (232), and a payload (230). The generation identifier (234) may be an integer, a real number, a string, etc. identifying the generation when the publisher message (212) was broadcasted. In one or more embodiments, "generation" is a reference to the makeup of the system (100) (e.g., one publisher node and N subscriber nodes). When an existing subscriber node leaves the system or when a new subscriber node joins the system, this may indicate the start of a new generation. The sequence number (232) may be an integer, a real number, a string, etc. that specifies the ordering of the publisher message (212) during the generation. The payload (230) may correspond to an instruction for execution by one or more of the subscriber nodes (185A, 185B, 185N) and/or a data value of any size required by one or more of the subscriber nodes (185A, 185B, 185N).

Figure 2B:
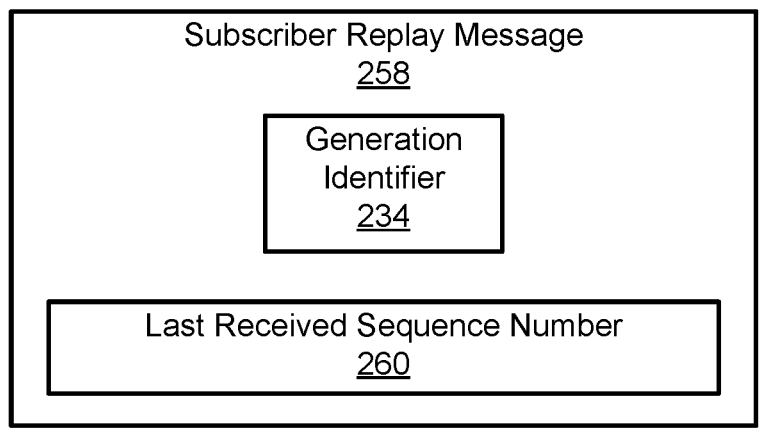

FIG. 2B shows a subscriber replay message (258) in accordance with one or more embodiments of the present disclosure. The subscriber replay message (258) is sent by a subscriber node (185A, 185B, 185N) to the publisher node (105) via the connection (125). As shown in FIG. 2B, the subscriber replay message (258) includes the last received sequence number (260), which is the sequence number of the last publisher message received by the subscriber node. The subscriber replay message (258) also includes the generation identifier (234) identifying the generation to which the last publisher message received by the subscriber node belongs.

Figure 2C:
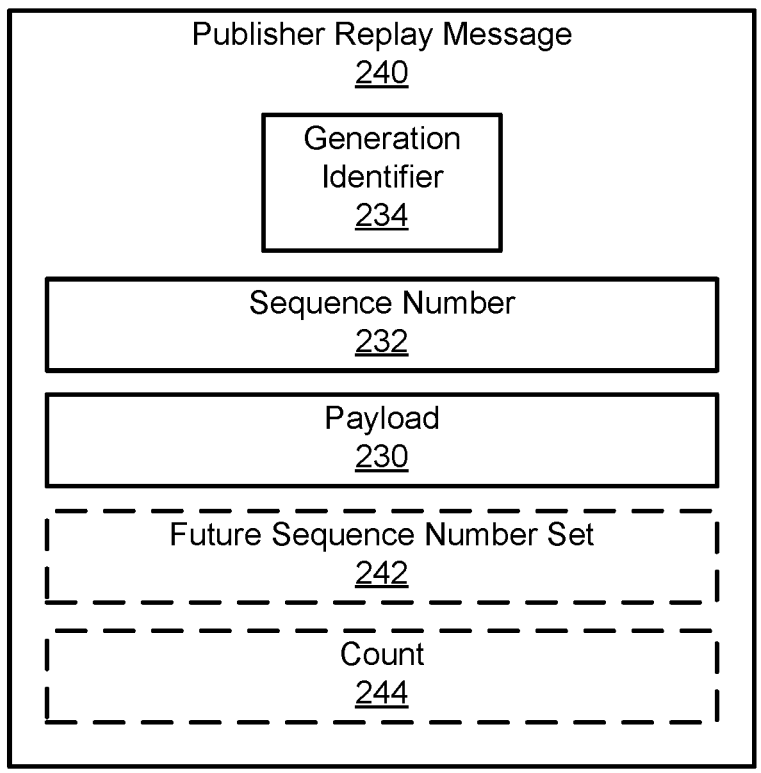

FIG. 2C shows a publisher replay message (240) in accordance with one or more embodiments of the present disclosure. The publisher replay message (240) is broadcasted by the publisher node (105) to the subscriber nodes (185A, 185B, 185N). One or more publisher replay messages may be broadcasted by the publisher node (185) in response to the subscriber replay message (258). The publisher replay message (240) corresponds to a previously broadcasted publisher message. As shown in FIG. 2C, the publisher replay message (240) includes the generation identifier (234), the sequence number (232), and the payload (230) of the previously broadcasted publisher message.

In one or more embodiments of the present disclosure, the publisher replay message (240) includes a set of future sequence numbers (242). The set of future sequence numbers (242) includes the sequence number (232). The set of future sequence numbers also includes the sequence numbers of all publisher messages previously broadcasted by the publisher node (105) that: (a) belong to the same generation specified by the generation identifier (234); and (b) have sequence numbers ordered after the sequence number (232).

In one or more embodiments of the present disclosure, the publisher replay message (240) includes a count (244). The count (244) may be a whole number identifying the number of previously broadcast publisher messages that: (a) belong to the generation specified by the generation identifier (234); and (b) have sequence numbers ordered after the sequence number (232).

Figure 2D:
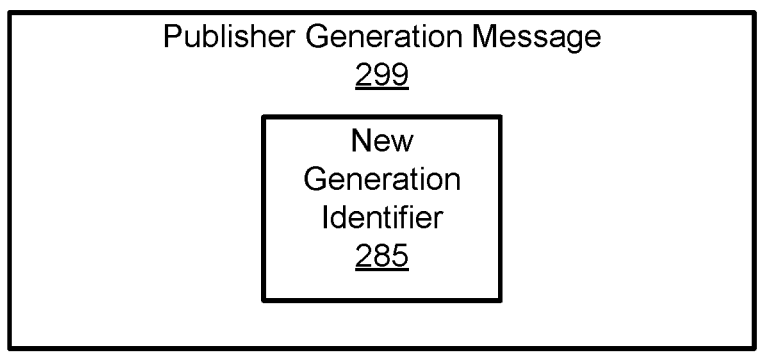

FIG. 2D shows publisher generation message (299) in accordance with one or more embodiments of the present disclosure. The publisher generation message (299) is broadcasted by the publisher node (105) to the subscriber nodes (185A, 185B, 185N). As shown in FIG. 2D, the publisher generation message (299) includes a new generation identifier (285).

Figure 3:
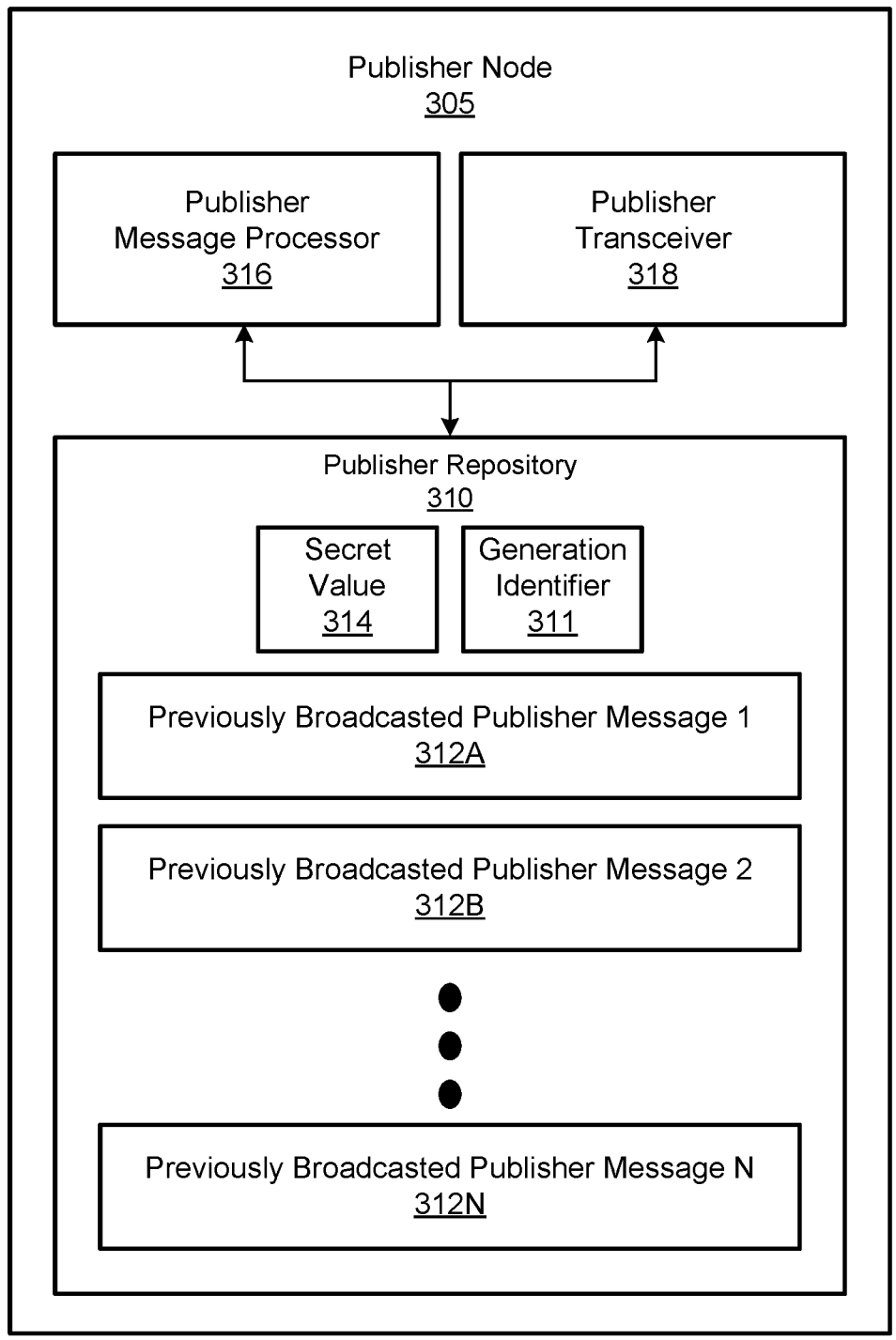
FIG. 3 shows a publisher node in accordance with one or more embodiments of the present disclosure.

FIG. 3 shows a publisher node (305) in accordance with one or more embodiments of the present disclosure. The publisher node (305) may correspond to publisher node (105), discussed above in reference to FIG. 1. As shown in FIG. 3, the publisher node (305) has multiple components including a publisher message processor (316), a publisher transceiver (318), and a publisher repository (310). Each of these components (310, 316, 318) may be implemented in hardware (e.g., circuits), software, or any combination of hardware and software.

In one or more embodiments, the publisher repository (310) stores a secret value (314) and a generation identifier (311). The secret value (314) is an integer, a real number, a string, etc. used to calculate sequence numbers. The secret value (314) is only known to the publisher node (305) and the subscriber nodes and may be changed at any time. Further, the generation identifier (311) may be an integer, a real number, an alphanumeric sequence, etc. that identifies a generation of publisher messages. Specifically, the generation identifier (311) identifies the current generation of publisher messages being broadcasted by the publisher node (305). Like the secret value (314), the generation identifier (311) may also be updated at any time (e.g., when a subscriber node joins or leaves, upon request of an existing subscriber node, following a randomly generated time window, etc.).

In one or more embodiments, the publisher repository (310) stores one or more publisher messages previously broadcasted by the publisher node (105) (e.g., previously broadcasted publisher message 1 (312A), previously broadcasted publisher message 2 (312B), previously broadcasted publisher message N (312N)). Each of the previously broadcasted messages publisher messages (312A, 312B, 312N) may be essentially the same as publisher message (212), discussed above in reference to FIG. 2A. These previously broadcasted publisher messages (312A, 312B, 312N) may belong to the same generation or different generation of publisher messages (discussed below). Moreover, each previously broadcasted publisher message may be indexed by its generation identifier and/or sequence number.

The publisher repository (310) may be implemented as a database, a cache memory, a hard drive, etc. Further, although FIG. 3 only shows a single publisher repository (310), in other embodiments, the publisher node (305) may have multiple publisher repositories. For example, one publisher repository may store only the secret value (314) while a different publisher repository may store only previously broadcasted publisher messages (312A, 312B, 312N) or only previously broadcasted publisher messages of a single generation.

In one or more embodiments of the present disclosure, the publisher message processor (316) is configured to provide the payloads for publisher messages. As discussed above, each payload may be an instruction for execution by one or more of the subscriber nodes and/or a data value for one or more of the subscriber nodes.

In one or more embodiments, the publisher transceiver (318) is configured to generate and broadcast publisher messages (e.g., publisher message (212)) with payloads provided by the publisher message processor (316). Generating a publisher message may include generating a sequence number for the publisher message based on the secret value (314) and the previous sequence number (discussed below). In one or more embodiments, the publisher transceiver (318) is configured to receive subscriber replay messages (e.g., subscriber replay message (258)), retrieve one or more previously broadcasted publisher messages (312A, 312B, 312N) based on the received subscriber replay message, and broadcast one or more publisher replay messages (e.g., publisher replay message (240)) corresponding to the retrieved previously broadcasted publisher messages (312A, 312B, 312N).

Figure 4:
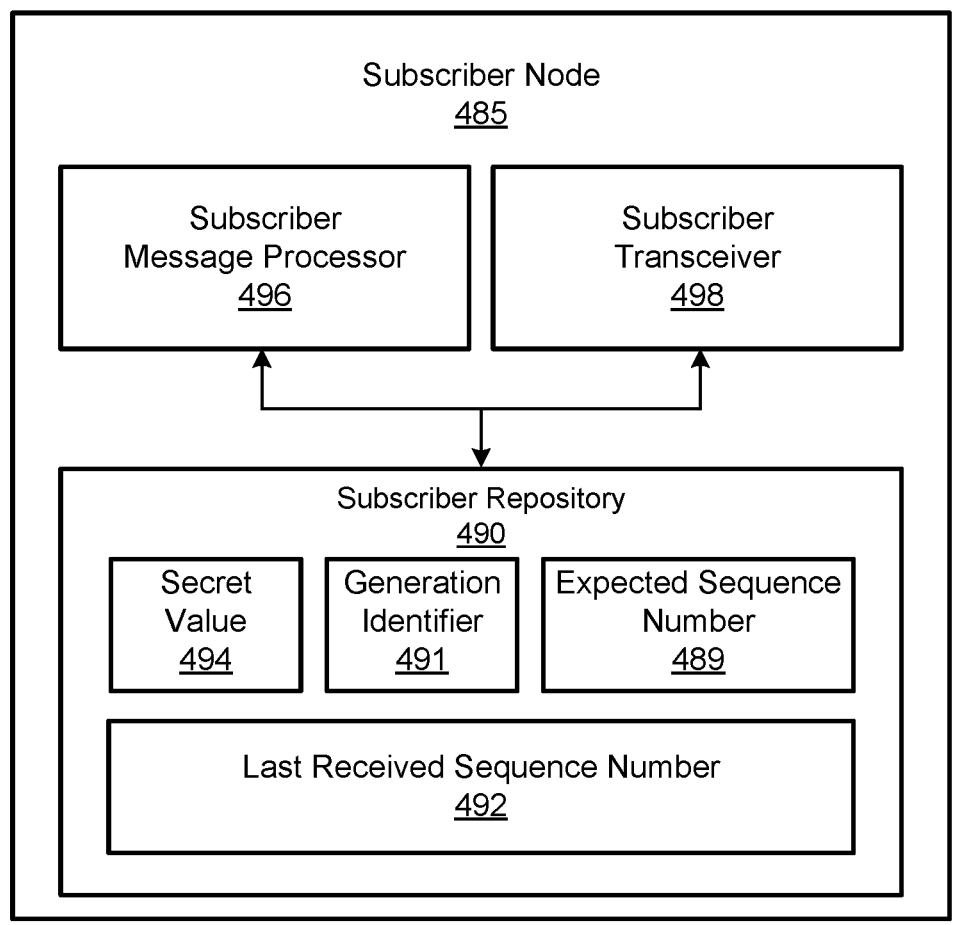
FIG. 4 shows a subscriber node in accordance with one or more embodiments of the present disclosure.

FIG. 4 shows a subscriber node (485) in accordance with one or more embodiments of the present disclosure. The subscriber node (485) may correspond to any of the subscriber nodes (185A, 185B, 185N) discussed above in reference to FIG. 1. As shown in FIG. 4, the subscriber node (485) has multiple components including a subscriber message processor (496), a subscriber transceiver (498), and a subscriber repository (490). Each of these components (490, 496, 498) may be implemented in hardware (e.g., circuits), software, or any combination of hardware and software.

In one or more embodiments, the subscriber repository (490) stores a last received sequence number (492). The last received sequence number (492) may correspond to the sequence number in the publisher message most recently received and accepted (i.e., not discarded) by the subscriber node (485). In one or more embodiments, the subscriber repository (490) may store the sequence numbers of all received publisher messages. These sequence numbers may be indexed based on generation identifiers. In other words, sequence numbers belonging to received publisher messages of the one generation may be retrieved separately from sequence numbers belonging to received publisher messages of a different generation.

In one or more embodiments of the present disclosure, the subscriber repository (490) stores a secret value (494) and a generation identifier (491). The generation identifier (491) identifies the generation of the publisher messages currently being received by the subscriber node (485). The secret value (494) is the same as the secret value (314). In other words, the secret value (494) may be an integer, a real number, a string, etc. known only to the publisher node and the subscribe nodes including subscribe node (485).

In one or more embodiments of the present disclosure, the subscriber repository (490) stores an expected sequence number (489). The expected sequence number (489) is the sequence number expected in the next publisher message that is received by the subscriber node (485). The expected sequence number (489) may be calculated using a one-way function, the secret value (494), and the last received sequence number (492).

The subscriber repository (490) may be implemented as a database, a cache memory, a hard drive, etc. Further, although FIG. 4 only shows a single subscriber repository (490), in other embodiments, the subscriber node (485) may have multiple subscriber repositories. For example, one subscriber repository may store only the secret value (494) while a different publisher repository may store only the last received sequence number (492). In one or more embodiments, maintaining separate repositories prevents a rogue application from being able to exfiltrate the secret value (494) and spoof sequence numbers.

In one or more embodiments of the present disclosure, the subscriber message processor (496) is configured to process the payloads in received publisher messages. As discussed above, each payload may be an instruction for execution by one or more of the subscriber nodes and/or a data value for one or more of the subscriber nodes. Accordingly, the message processor (496) may execute the instruction specified in the payload or forward the instruction to another component (e.g., processor core) (not shown) for execution. Additionally or alternatively, the message processor (496) may utilize the data value(s) specified in the payload or forward the data value to another component for utilization.

In one or more embodiments of the present disclosure, the subscriber transceiver (498) is configured to accept or discard incoming messages including publisher messages and publisher replay messages. The subscriber transceiver (498) may also be configured to determine whether at least one publisher message has been dropped (e.g., by connection (125)) based on the expected sequence number (489) (discussed below). Further still, the subscriber transceiver (498) may be configured to send subscriber replay messages (e.g., subscriber replay message (258)) to the publisher node or reset request messages to the publisher node.

Figure 5:
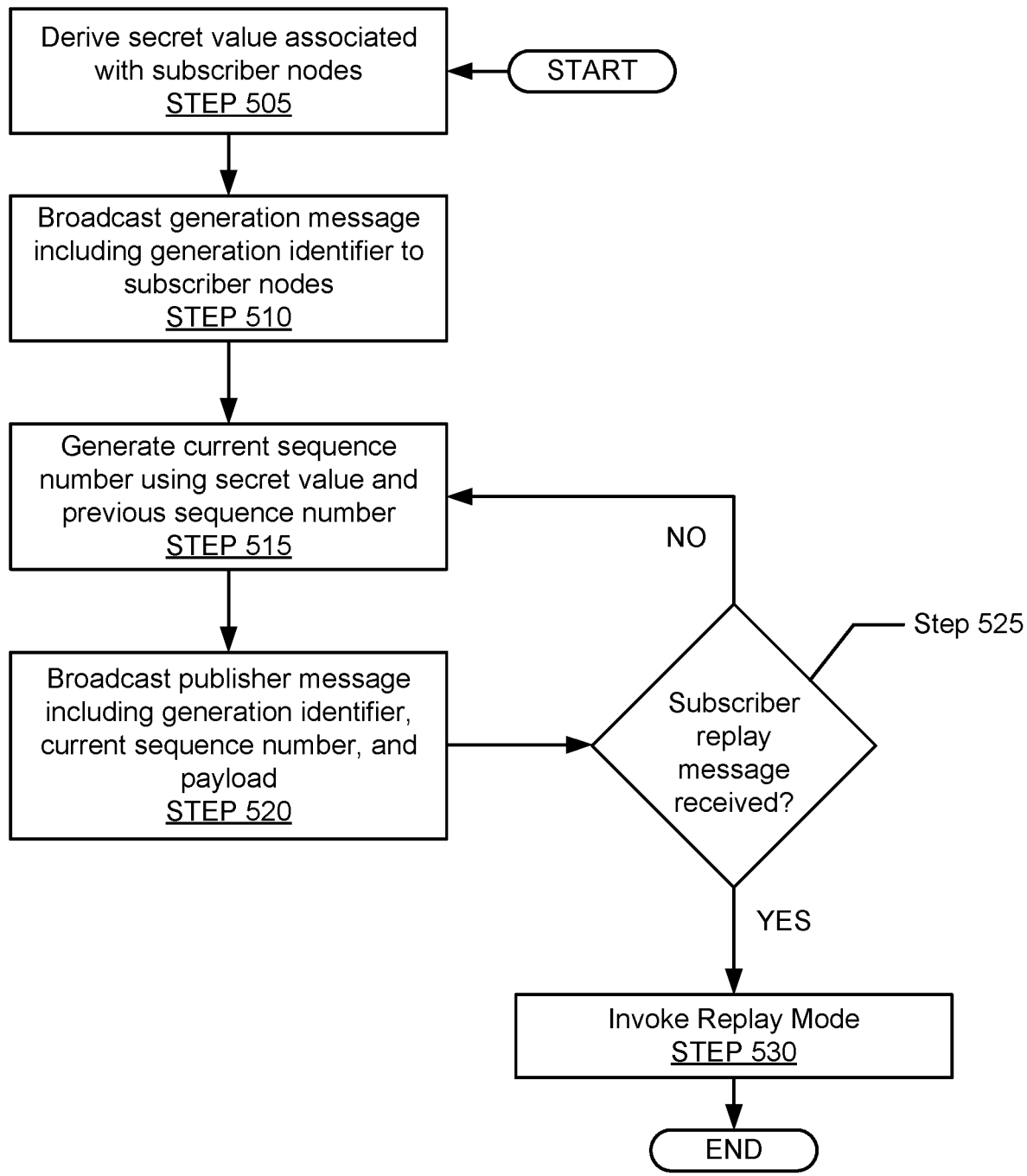
FIGS. 5-7, 8A, and 8B show flowcharts in accordance with one or more embodiments of the present disclosure.

FIG. 5 shows a flowchart in accordance with one or more embodiments of the present disclosure. The flowchart of FIG. 5 depicts a process for managing messages. The process may be performed by one or more components of the publisher node (305) (e.g., publisher transceiver (318)), discussed above in reference to FIG. 3. Moreover, some or all of the steps in FIG. 5 may be used to generate ordered sequence numbers that are difficult to guess/spoof and determine whether a connection (e.g., connection (125)) is dropping messages. In one or more embodiments, one or more of the steps shown in FIG. 5 may be omitted, repeated, and/or performed in a different order than the order shown in FIG. 5. Accordingly, the scope of the present disclosure should not be considered limited to the specific arrangement of steps shown in FIG. 5.

Initially, a secret value is derived between the publisher node and the one or more subscriber nodes (STEP 505). The secret value may correspond to an integer, a real number, a string, etc. The secret value may be generated by the publisher node and then shared with the subscriber nodes via an encrypted channel Additionally or alternatively, the secret value may be generated by a subscriber node and then shared, via encrypted channels, with the publisher node and the other subscriber node(s). The secret value may be the output of a random number generator or other methods capable of developing a difficult to guess value that may be shared between a publisher and subscriber node. Once the secret value is derived, the secret value is stored in a repository of the publisher node.

In STEP 510, the publisher node broadcasts a generation message to the subscriber nodes. The generation message includes a generation identifier, which may be an integer, a real number, a string, etc. If this is the initial generation message, the generation identifier may be generated by a random number generator or other methods capable of developing a difficult to guess value that may be shared between a publisher and subscriber node. If this is not the initial generation message, the generation identifier may be generated by incrementing the previous generation identifier. After generating the generation identifier, the generation identifier may be stored in a repository of the publisher node.

In STEP 515, a current sequence number ($S_X$) is generated. If this is the initial execution of STEP 515, the current sequence number $S_X$ may be calculated as follows: $S_X$=H(ce+k), where H( ) is a one-way function such as a hash function, c and k are constants, and e is the secret value from STEP 505. If this is not the initial execution of STEP 515, the current sequence number ($S_X$) may be calculated as follows: $S_X$=H(a$S_{X-1}$+ce+k), where H( ) is a one-way function, a, c, and k are constants, e is the secret value from STEP 505, and $S_{X-1}$ is the previous sequence number stored in the publisher repository. In one or more embodiments of the present disclosure, a=c=1 and k=0. As discussed above, the one way function H( ) is a function that is impossible or at least very difficult to reverse.

In STEP 520, a publisher message is generated and broadcasted to the subscriber nodes. The publisher message includes the generation identifier of STEP 510, and the sequence number of STEP 515. The publisher message also includes a payload, such as an instruction or data value for one or more of the subscriber nodes. The previously broadcasted message may be stored in a repository of the publisher node.

In STEP 525 it is determined whether a subscriber replay message is received. As discussed above, those skilled in the art, having the benefit of this detailed description, will appreciate that receiving a subscriber replay message is an indication that at least one previously broadcasted publisher message was dropped and/or an unauthorized third party is attempting to broadcast publisher messages and fool the subscriber nodes (e.g., spoofing). This is a technical improvement to at least the technical fields of computer networking, cellular networks, and online security.

When it is determined that no subscriber replay message has been received, the process may return to STEP 515. However, when it is determined that a subscriber replay message has been received, the process may proceed to STEP 530.

In STEP 530, the publisher node is placed in replay node. Specifically, the publisher node may broadcast one or more publisher replay messages. The details of STEP 530 are discussed below in reference to FIG. 6.

Although STEP 525 as illustrated involves receiving a subscriber replay message, in other embodiments, STEP 525 involves receiving a reset request message from a subscriber node. In such embodiments, the process depicted in FIG. 5 may return to STEP 505.

Figure 6:
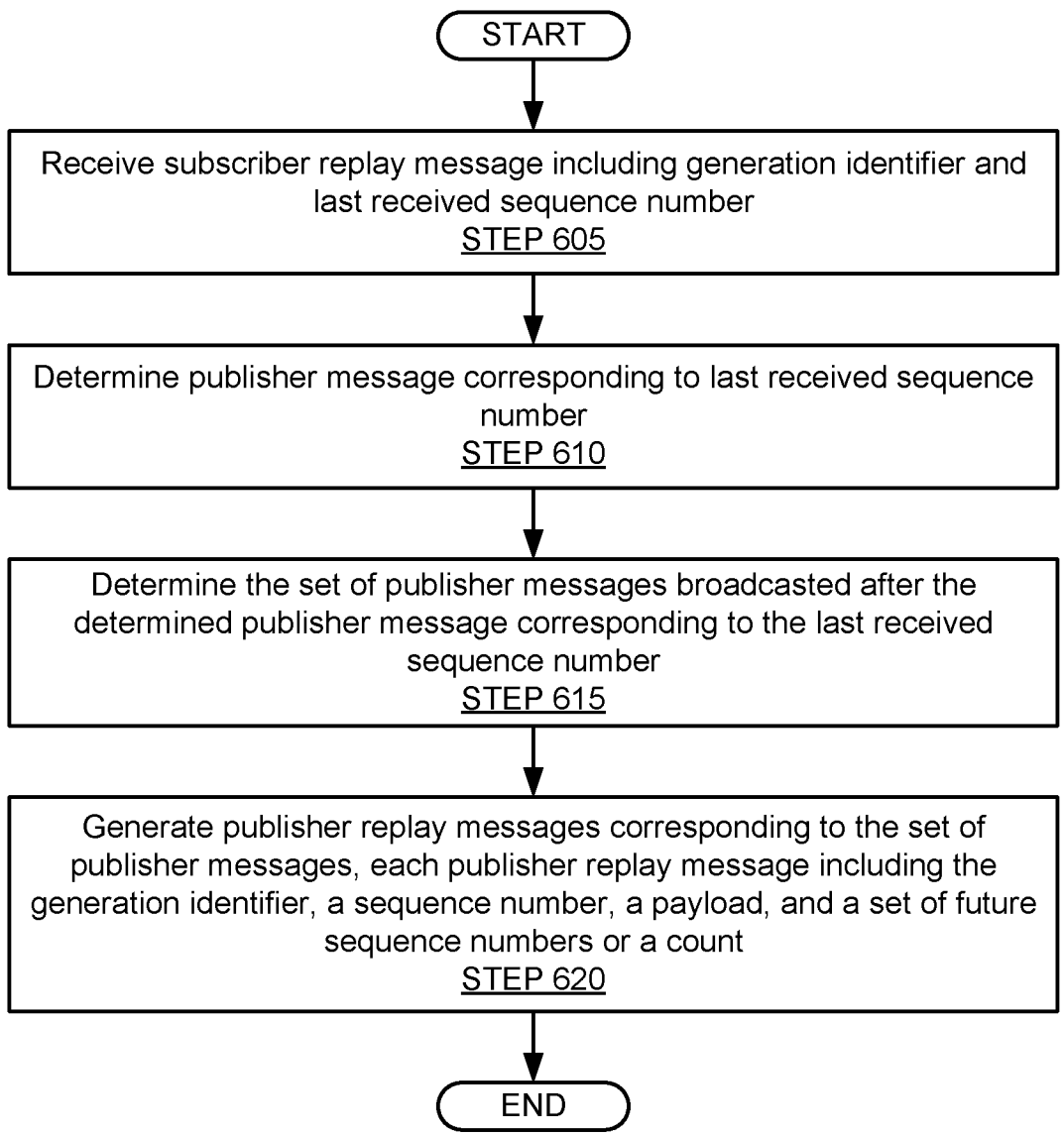

FIG. 6 shows a flowchart in accordance with one or more embodiments of the present disclosure. The flowchart of FIG. 6 depicts a process for managing messages. The process may be performed by one or more components of the publisher node (305) (e.g., publisher transceiver (318)), discussed above in reference to FIG. 3. Moreover, some or all of the steps in FIG. 6 correspond to STEP 525 and/or STEP 530 in FIG. 5. In one or more embodiments, one or more of the steps shown in FIG. 6 may be omitted, repeated, and/or performed in a different order than the order shown in FIG. 6. Accordingly, the scope of the present disclosure should not be considered limited to the specific arrangement of steps shown in FIG. 6.

Initially, a subscriber replay message is received from one of the subscribers (STEP 605). The subscriber replay message includes a generation identifier. The subscriber message also includes the last received sequence number of the subscriber node that sent the subscriber replay message. As discussed above, the last received sequence number is the sequence number in the publisher message most recently received and accepted (i.e., not discarded) by the subscriber node.

In STEP 610, the publisher message corresponding to the last received sequence number is determined. This may include using both the generation identifier and the last received sequence number from the subscriber replay message to search a repository of the publisher node for the previously broadcasted publisher message having the matching generation identifier and sequence number. Those skilled in the art, having the benefit of this detailed description, will appreciate that this determined publisher message was the last publisher message to successfully reach the subscriber node.

In STEP 615, a set of previously broadcasted publisher messages is determined. The set includes the zero or more publisher messages that were broadcasted after the publisher message determined in STEP 610. The set may be determined by searching a repository of the publisher node for all previously broadcasted publisher messages having both the generation identifier of the subscriber replay message and a sequence number ordered after the sequence number of the publisher message determined in STEP 610 (i.e., ordered after the last received sequence number in the subscribe replay message).

In STEP 620, a set of publisher replay messages is generated and broadcasted to the subscriber nodes. Each publisher replay message corresponds to one of the publisher messages determined in STEP 615. Moreover, each publisher replay message includes the content of the corresponding publisher message (e.g., generation identifier, sequence number, payload) in addition to a set of future sequence numbers and/or a count.

In one or more embodiments of the present disclosure, the set of future sequence numbers for a publisher replay message includes the sequence number of the publisher replay message and the sequence numbers of all publisher replay messages that follow. For example, assume there are 4 publisher replay messages (PRMs): PRM1, PRM2, PRM3, PRM4. Further, assume PRM1 has sequence number $S_1$, PRM2 has sequence number $S_2$, PRM3 has sequence number $S_3$, and PRM4 has sequence number $S_4$. The set of future sequence numbers for PRM1 would be S1, S2, S3, and S4. The set of future sequence numbers for PRM2 would be S2, S3, and S4. The set of future sequence numbers for PRM3 would be S3 and S4. The set of future sequence numbers for PRM4 would be S4.

Those skilled in the art, having the benefit of this detailed description, will appreciate that the set of future sequence numbers for PRM2 is a proper subset of the set of future sequence numbers for PRM1. Similarly, the set of future sequence numbers for PRM3 and PRM4 are proper subsets of the sets of future sequence numbers for PRM2 and PRM3, respectively.

In one or more embodiments of the present disclosure, the count for a publisher replay message is a whole number identifying the number of previously broadcast publisher messages that: (a) have the same generation identifier as the publisher replay message; and (b) have sequence numbers ordered after the sequence number in the publisher replay message. Still referring to the previous example, PRM1 would include a count of 3, PRM2 would include a count of 2, PRM3 would include a count of 1, and PRM4 would include a count of 0.

Those skilled in the art, having the benefit of this detailed description, will appreciate that the count for PRM2 is the count for PRM1 decremented by one. Similarly, the count for PRM3 is the count for PRM2 decremented by one, etc.

Figure 7:
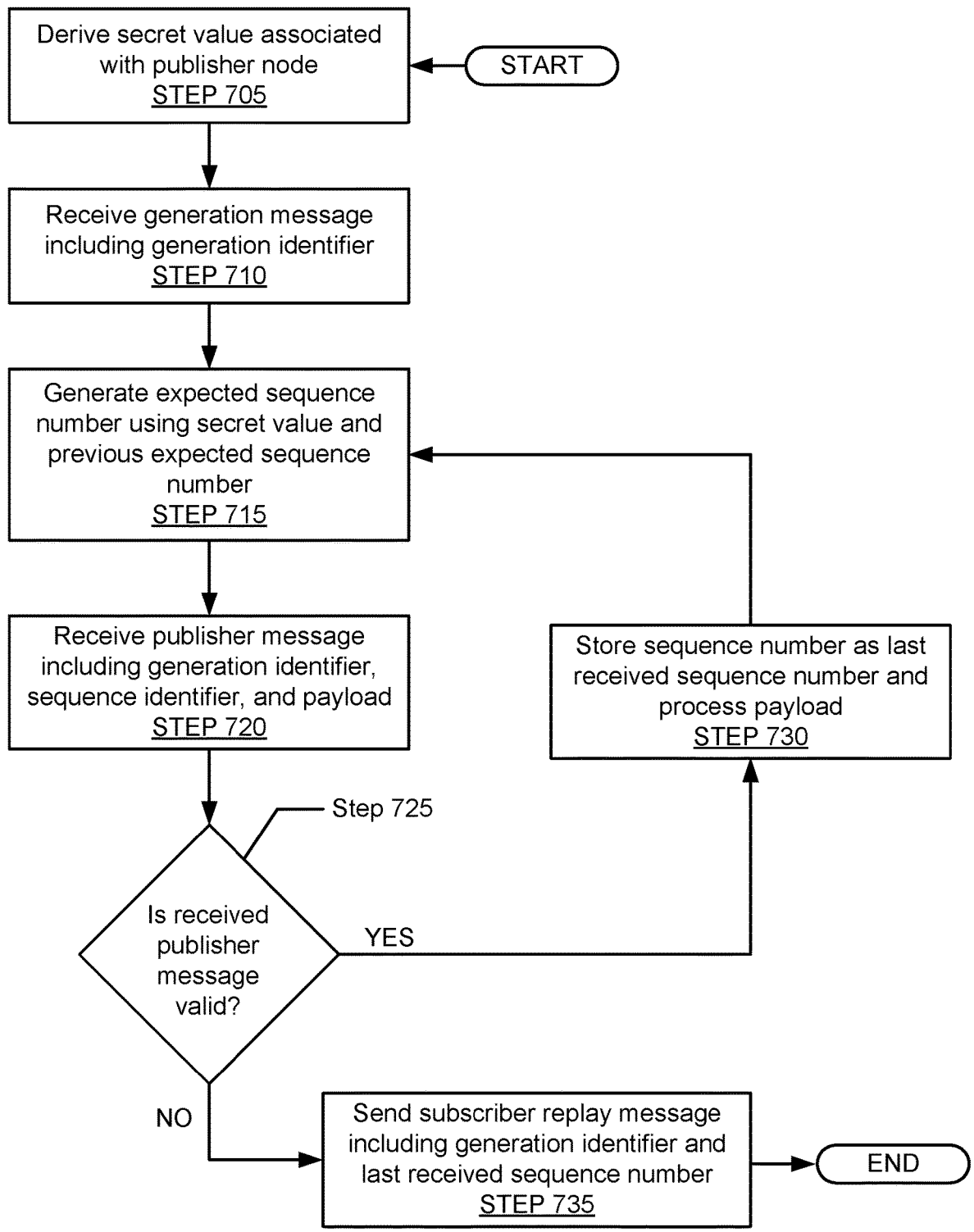

FIG. 7 shows a flowchart in accordance with one or more embodiments of the present disclosure. The flowchart of FIG. 7 depicts a process for managing messages. The process may be performed by one or more components of the subscriber node (485) (e.g., subscriber transceiver (498), subscriber message processor (496)), discussed above in reference to FIG. 4. Moreover, some or all of the steps in FIG. 7 may be used to generate ordered sequence numbers that are difficult to guess/spoof and determine whether a connection (e.g., connection (125)) is dropping messages. In one or more embodiments, one or more of the steps shown in FIG. 7 may be omitted, repeated, and/or performed in a different order than the order shown in FIG. 7. Accordingly, the scope of the present disclosure should not be considered limited to the specific arrangement of steps shown in FIG. 7.

Initially, a secret value is derived between the publisher node and the one or more subscriber nodes (STEP 705). The secret value may correspond to an integer, a real number, a string, etc. The secret value may be generated by the publisher node and then shared with the subscriber nodes via an encrypted channel Additionally or alternatively, the secret value may be generated by a subscriber node and then shared, via encrypted channels, with the publisher node and the other subscriber node(s). The secret value may be the output of a random number generator. Once the secret value is derived, the secret value is stored in a repository of the subscriber node.

In STEP 710, the subscriber node receives a generation message from the publisher node. The generation message includes a generation identifier, which may be an integer, a real number, a string, etc. The generation identifier may be stored in a repository of the subscriber node.

In STEP 715, an expected sequence number $(S_X)$ is generated. If this is the initial execution of STEP 715, the expected sequence number Sx may be calculated as follows: $S_X = H(ce+k)$, where H( ) is a one-way function such as a hash function, c and k are constants, and e is the secret value from STEP 705. If this is not the initial execution of STEP 715, the expected sequence number $S_X$ may be calculated as follows: $S_X = H(aS_{X-1}+ce+k)$, where H( ) is a one-way function, a, c, and k are constants, e is the secret value from STEP 705, and $S_{X-1}$ is the last received sequence number stored in a repository of the subscriber node. In one or more embodiments of the present disclosure, a=c=1 and k=0.

Those skilled in the art, having the benefit of this detailed description, will appreciate that by using the secret value, the previous expected sequence number, and the one-way function, both the publisher node and subscriber node are able to generate the next sequence number. However, an unauthorized third-party is unable to generate the next sequence number, even if the unauthorized third-party has access to the publisher messages. In other words, the unauthorized third-party is unable to guess the next sequence number, which reduces the likelihood of a spoof attack. This is a technical improvement to at least the technical fields of computer networking, cellular networks, and online security.

In STEP 720, a publisher message is received from the publisher node. The publisher message includes a generation identifier and a payload, such as an instruction or data value for one or more of the subscriber nodes. The publisher message also includes a sequence number.

In STEP 725, it is determined whether the received publisher message is valid. Determining whether the received publisher message is valid may include comparing the expected sequence number with the sequence number in the publisher message. Determining whether the received publisher message is valid may also include comparing the generation identifier in the publisher message with the generation identifier received in STEP 710. The received publisher message is valid if: (i) the sequence number in the publisher message matches (e.g., equals) the expected sequence number; and (ii) the generation identifier in the received publisher message matches the generation identifier received in STEP 710. When it is determined that the publisher message is valid, the publisher message is accepted and the process proceeds to STEP 730. When it is determined that the publisher message is invalid (i.e., there is a mismatch in either of the mentioned comparisons), the received publisher message is discarded and the process proceeds to STEP 735.

Those skilled in the art, having the benefit of this detailed description, will appreciate that the subscriber node may determine that at least one publisher message has been dropped if the received publisher message is invalid (i.e., STEP 725 is FALSE). For example, if there is a mismatch between the sequence number in the received publisher message and the expected sequence number, this mismatch is indicative that at least the publisher message with a sequence number matching the expected sequence number was dropped. This is a technical improvement to at least the technical fields of computer networking and cellular networks. Other publisher messages may have also been dropped before the publisher message in STEP 720 was received.

In STEP 730, the sequenced number in the received publisher message is stored as the last received sequence number, and the payload of the publisher message is processed. For example, if the payload is an instruction, the instruction may be executed in STEP 730 or forwarded to a component for execution. The process may then return to STEP 715.

In STEP 735, a subscriber replay message is generated and sent to the publisher node. The subscriber replay message includes the generation identifier and the last received sequence number stored in the repository of the subscriber node. This subscriber replay message will alert the publisher node as to the dropped publisher message and trigger the publisher node to broadcast publisher replay messages.

Figure 8A:
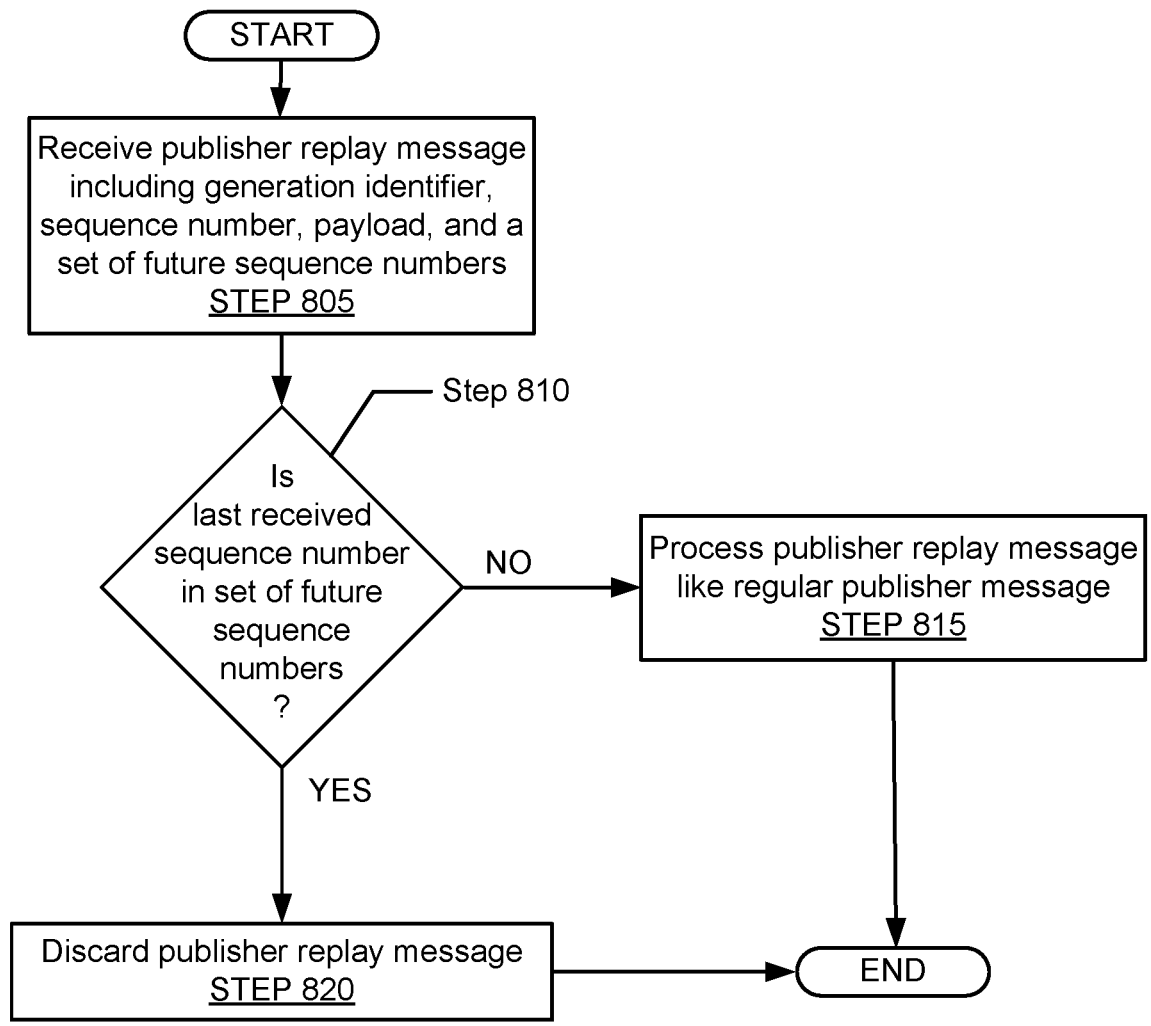

FIG. 8A shows a flowchart in accordance with one or more embodiments of the present disclosure. The flowchart of FIG. 8A depicts a process for managing messages. The process may be performed by one or more components of the subscriber node (485) (e.g., subscriber transceiver (498), subscriber message processor (496)), discussed above in reference to FIG. 4. Moreover, some or all of the steps in FIG. 8A may be performed following STEP 735 in FIG. 7. In one or more embodiments, one or more of the steps shown in FIG. 7 may be omitted, repeated, and/or performed in a different order than the order shown in FIG. 8A. Accordingly, the scope of the present disclosure should not be considered limited to the specific arrangement of steps shown in FIG. 8A.

Initially, a publisher replay message is received (STEP 805). The publisher replay message may be received in response to a subscriber node sending the publisher node a subscriber replay message (e.g., STEP 735, discussed above in reference to FIG. 7). The publisher replay message includes a generation identifier, a sequence number, a payload, and a set of future sequence numbers (discussed above). As discussed above, the publisher replay message corresponds to a publisher message that was previously broadcasted by the publisher node.

In STEP 810, the subscriber node's last received sequence number is retrieved and compared with the set of future sequence numbers in the publisher replay message. Specifically, it is determined whether the set of future sequence numbers includes the last received sequence number stored by the subscriber node. When it is determined that the set of future sequence numbers in the publisher replay message includes the last received sequence number, the process proceeds to STEP 820. Otherwise, when it is determined that the set of future sequence numbers does not include the last received sequence number, the process proceeds to STEP 815.

In STEP 820, the publisher replay message is discarded. Specifically, when STEP 810 is TRUE, the subscriber node has previously received and processed the publisher message corresponding to the publisher replay message. The payload in the publisher replay message has already been processed.

In STEP 815, the publisher replay message is processed like a regular publisher message. Specifically, when STEP 810 is FALSE, the subscriber node has not yet received the publisher message corresponding to the publisher replay message. Accordingly, STEP 725 and other steps of FIG. 7 may be executed for the received publisher replay message.

Figure 8B:
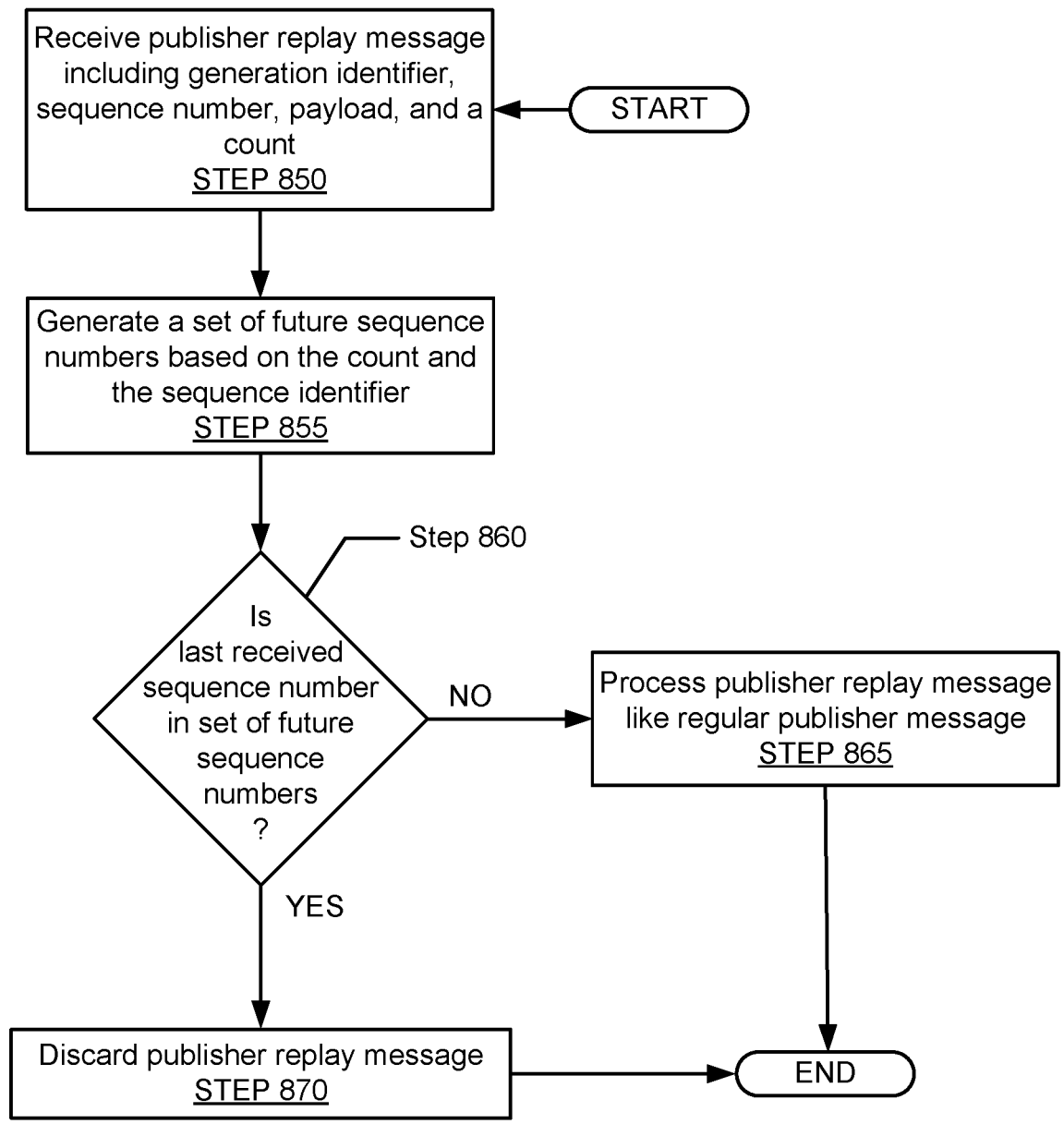

FIG. 8B shows a flowchart in accordance with one or more embodiments of the present disclosure. The flowchart of FIG. 8B depicts a process for managing messages. The process may be performed by one or more components of the subscriber node (485) (e.g., subscriber transceiver (498), subscriber message processor (496)), discussed above in reference to FIG. 4. Moreover, some or all of the steps in FIG. 8B may be performed following STEP 735 in FIG. 7. In one or more embodiments, one or more of the steps shown in FIG. 7 may be omitted, repeated, and/or performed in a different order than the order shown in FIG. 8B. Accordingly, the scope of the present disclosure should not be considered limited to the specific arrangement of steps shown in FIG. 8B. In one or more embodiments, FIG. 8B and an alternative to FIG. 8A.

Initially, a publisher replay message is received (STEP 850). The publisher replay message may be received in response to a subscriber node sending the publisher node a subscriber replay message (e.g., STEP 735, discussed above in reference to FIG. 7). The publisher replay message includes a generation identifier, a sequence number, a payload, and a count (discussed above). As discussed above, the publisher replay message corresponds to a publisher message that was previously broadcasted by the publisher node.

In STEP 855, the subscriber node generates a set of future sequence numbers based on the count and the sequence number ($S_Y$), as specified in the publisher replay message, and the secret value stored in a repository of the subscriber node. If the count is N, the subscriber node generates $S_{Y+1}$, $S_{Y+2}$, $S_{Y+3}$, . . . , $S_{Y+N-2}$, $S_{Y+N-1}$, $S_N$, and the set of future sequence numbers would be: $S_Y$, $S_{Y+1}$, $S_{Y+2}$, $S_{Y+3}$, $S_{Y+N-2}$, $S_{Y+N-1}$, $S_N$. For example, assume the count is 3. The subscriber node would generate $S_{Y+1}$, $S_{Y+2}$, $S_{Y+3}$, and the set of future sequence numbers would be: $S_Y$, $S_{Y+1}$, $S_{Y+2}$, $S_{Y+3}$.

In STEP 860, the subscriber node's last received sequence number is retrieved and compared with the set of future sequence numbers generated by the subscriber node. Specifically, it is determined whether the set of future sequence numbers includes the last received sequence number stored by the subscriber node. When it is determined that the set of future sequence numbers includes the last received sequence number, the process proceeds to STEP 870. Otherwise, when it is determined that the set of future sequence numbers does not include the last received sequence number, the process proceeds to STEP 865.

In STEP 870, the publisher replay message is discarded. Specifically, when STEP 860 is TRUE, the subscriber node has previously received and processed the publisher message corresponding to the publisher replay message. The payload in the publisher replay message has already been processed.

In STEP 865, the publisher replay message is processed like a regular publisher message. Specifically, when STEP 860 is FALSE, the subscriber node has not yet received the publisher message corresponding to the publisher replay message. Accordingly, STEP 725 and other steps of FIG. 7 may be executed for the received publisher replay message.

As yet an alternative to both FIG. 8A and FIG. 8B, each subscriber node may store the sequence number and generation identifier of every publisher message received by the subscriber node. In such embodiments, the generation identifier and the sequence number in the received publisher reply message are compared with the stored pairs of generation identifiers and sequence numbers. If there is a match, the received publisher replay message may be discard (similar to STEPS 820 and 870). If there is no match, the received publisher message may be processed liked a regular publisher message (similar to STEPS 815 and 865).

In one or more embodiments, assume a subscriber node expects to receive a publisher message PM1 with sequence number Sc, but instead receives a publisher message PM2 with sequence number SK. As discussed above, a subscriber replay message is triggered by $S_C$ not equaling $S_K$. In response to sending the subscriber replay message, the subscriber node receives a publisher replay message PRM1 with sequence number $S_C$ and then a publisher replay message PRM2 with sequence number $S_K$. If the payload of PRM2 equals the payload of PM2, this is an indication that there was just a transmission error. However, if the payload of PRM2 does not equal the payload of PM2, this might indicate that PM2 and/or PRM2 are spoofed, and thus, it might be prudent to change the connection linking the publisher node and the subscriber node.

Figure 9:
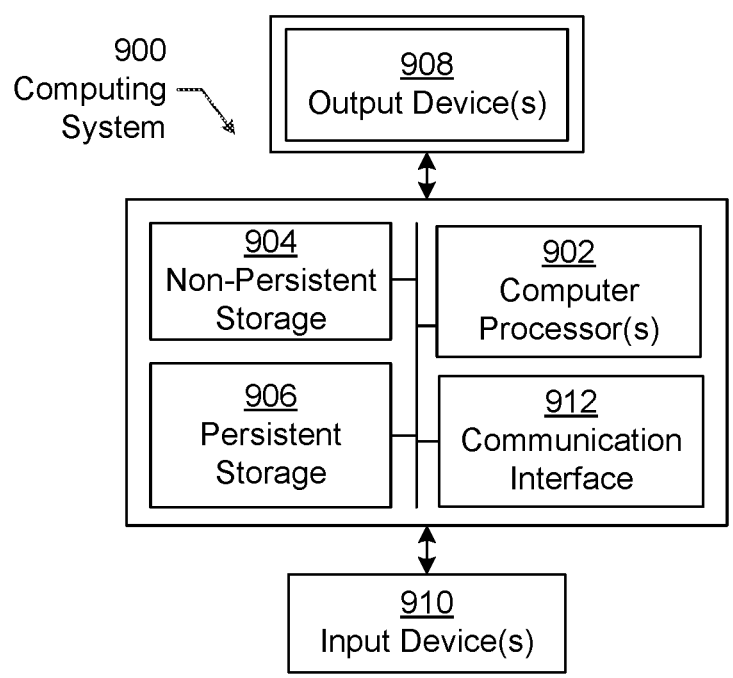
FIG. 9 shows a computer system in accordance with one or more embodiments of the present disclosure.

Embodiments of the present disclosure may be implemented on a computing system. Any combination of mobile, desktop, server, router, switch, embedded device, or other types of hardware may be used. For example, as shown in FIG. 9, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (904), and persistent storage (906). Many different types of computing systems exist, and the aforementioned input and output device(s) may take other forms.

Software instructions in the form of computer readable program code to perform embodiments of the present disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the present disclosure.

Thus, the embodiments and examples set forth herein were presented in order to best explain various embodiments and their particular application(s) and to thereby enable those skilled in the art to make and use the embodiments. However, those skilled in the art will recognize that the foregoing description and examples have been presented for the purposes of illustration and example only. The description as set forth is not intended to be exhaustive or to be limiting to the precise form disclosed.

While many embodiments have been described, those skilled in the art, having benefit of this disclosure, will appreciate that other embodiments can be devised which do not depart from the scope. Accordingly, the scope of the present disclosure should be limited only by the attached claims.

What is claimed is:

1. A method, comprising:
    deriving, by a first subscriber node (SN), a secret value associated with a publisher node (PN);
    generating, by the first SN, a first expected sequence number using a one-way function and the secret value;
    receiving, by the first SN, a first publisher message generated by the PN and comprising a first sequence number;
    validating, by the first SN, the first publisher message by comparing the first sequence number with the first expected sequence number;
    processing, by the first SN, a payload of the first publisher message in response to the first sequence number and the first expected sequence number matching;
    generating, by the first SN node, a second expected sequence number using the one-way function, the first sequence number, and the secret value;
    receiving, by the first SN node, a second publisher message comprising a second sequence number;
    comparing the second sequence number with the second expected sequence number; and
    determining, by the first SN node, a third publisher message is dropped in response to identifying a mismatch between the second sequence number and the second expected sequence number.

2. The method of claim 1, further comprising:
    generating, by the first SN node and in response to the mismatch, a subscriber replay message comprising the first sequence number;

sending, by the first SN node, the subscriber replay
message to the PN;
receiving a first publisher replay message corresponding
to the third publisher message, the first publisher replay
message comprising:
a third sequence number; and
a payload of the third publisher message;
validating, by the first SN, the first publisher replay
message by comparing the third sequence number with
the second expected sequence number; and
generating, by the first SN, a third expected sequence
number.

3. The method of claim 2, wherein the first SN and the PN are located on different computing devices linked by a connection that dropped the third publisher message.

4. The method of claim 2, further comprising:
receiving a second publisher replay message corresponding to the second publisher message, the second publisher replay message comprising:
the second sequence number; and
a payload of the second publisher message;
validating, by the first SN, the second publisher replay message by comparing the second sequence number with the third expected sequence number.

5. The method of claim 2, further comprising:
receiving, by a second SN, the first publisher replay message, the first publisher replay message further comprising a set of future sequence numbers;
retrieving a last received sequence number of the second SN;
determining, by the second SN, that the set of future sequence numbers comprises the last received sequence number of the second SN; and
discarding, by the second SN, the first publisher replay message.

6. The method of claim 2, further comprising:
receiving, by a second SN, the first publisher replay message, the first publisher replay message further comprising a count of future sequence numbers;
generating a set of future sequence numbers based on the one-way function, the count, and the third sequence number;
retrieving, by the second SN, a last received sequence number of the second SN;
determining, by the second SN, that the set of future sequence numbers comprises the last received sequence number of the second SN; and
discarding, by the second SN, the second publisher replay message.

7. The method of claim 2, further comprising:
receiving, by the first SN, a publisher generation message comprising a generation identifier;
storing the generation identifier,
wherein the first publisher message, the second publisher message, the subscriber replay message, and the first publisher replay message further comprise the generation identifier, and
wherein validating the first publisher message further comprises comparing the generation identifier in the first publisher message with the stored generation identifier.

8. The method of claim 7, further comprising:
sending, by a new SN, a reset request message to the PN;
deriving, by the new SN, a new secret value associated with the PN;
deriving, by the first SN, the new secret value associated with the PN;
receiving, by the first SN and the new SN, a new publisher generation message comprising a new generation identifier.

9. A method, comprising:
deriving, by a publisher node (PN), a secret value associated with a plurality of subscriber nodes (SNs) and a generation identifier;
broadcasting, to the plurality of SNs, a first publisher message comprising the generation identifier and a first sequence number;
broadcasting, to the plurality of SNs, a second publisher message comprising the generation identifier and a second sequence number generated using a one-way function, the first sequence number, and the secret value;
receiving, by the PN and from a SN of the plurality of SN, a subscriber replay message comprising the generation identifier and a third sequence number corresponding to a third publisher message,
wherein the third publisher message was previously broadcasted by the PN;
determining, by the PN, a set of publisher messages previously broadcasted by the PN after the third publisher message;
broadcasting, to the plurality of SNs, a set of publisher replay messages corresponding to the set of publisher messages;
wherein the set of publisher replay messages comprises a first publisher replay message and a second publisher replay message;
wherein the first publisher replay message comprises a set of future sequence numbers corresponding to the set of publisher messages;
wherein the set of future sequence numbers are all ordered after the third sequence number; and
wherein the second publisher replay message comprises a proper subset of the set of future sequence numbers.

10. The method of claim 9, wherein:
the first publisher replay message corresponds to the first publisher message;
the set of future sequence number comprises the first sequence number and the second sequence number;
the second publisher replay message corresponds to the second publisher message; and
the proper subset comprises the second sequence number but excludes the first sequence number.

11. The method of claim 9, further comprising:
determining a count of the set of publisher messages;
wherein the first publisher replay message comprises the count; and
wherein the second publisher replay message comprises the count decremented by one.

12. The method of claim 11, wherein:
the set of publisher messages comprises the first publisher message and the second publisher message;
the first publisher replay message corresponds to the first publisher message and further comprises the first sequence number; and
the second publisher replay message corresponds to the second publisher message and further comprises the second sequence number.

13. A system, comprising:
a subscriber repository storing:
a secret value associated with a publisher node (PN); and
a last received sequence number of a first subscriber node (SN);

a subscriber transceiver coupled to the subscriber repository and configured to:
  generate a first expected sequence number using a one-way function and the secret value;
  receive a first publisher message generated by the PN and comprising a first sequence number;
  validate the first publisher message by comparing the first sequence number with the first expected sequence number;
  storing the first sequence number as the last received sequence number in the subscriber repository; and
  generating a second expected sequence number using the one-way function, the first sequence number, and the secret value; and
a subscriber message processor configured to process a payload of the first publisher message in response to the first sequence number and the first expected sequence number matching,
wherein the subscriber repository, the subscriber transceiver, and the subscriber message processor are located within the first SN;
wherein the subscriber transceiver is further configured to:
  receive a second publisher message comprising a second sequence number;
  compare the second sequence number with the second expected sequence number;
  determine a third publisher message is dropped in response to a mismatch between the second sequence number and the second expected sequence number;
  retrieve the last received sequence number from the subscriber repository,
  wherein the last received sequence number is the first sequence number;
  generate, in response to the mismatch, a subscriber replay message comprising the last received sequence number; and
  send the subscriber replay message to the PN.

14. The system of claim 13, further comprising:
a publisher repository storing a plurality of previously broadcasted publisher messages;
a publisher transceiver coupled to the publisher repository and configured to:
  receive the subscriber replay message comprising the last received sequence number;
  determine the last received sequence number in the subscriber replay message corresponds to the first publisher message;
  determine a set of publisher messages comprising the third publisher message broadcasted after the first publisher message;
  broadcast a set of publisher replay messages corresponding to the set of publisher messages,
wherein the publisher repository and the publisher transceiver are located in the PN.

15. The system of claim 14, wherein the subscriber transceiver is further configured to:
receive a first publisher replay message corresponding to the third publisher message, the first publisher replay message comprising:
  a third sequence number; and
  a payload of the third publisher message;
validate the first publisher replay message by comparing the third sequence number with the second expected sequence number;
generate a third expected sequence number;
receive a second publisher replay message corresponding to the second publisher message, the second publisher replay message comprising:
  the second sequence number; and
  a payload of the second publisher message;
validate the second publisher replay message by comparing the second sequence number with the third expected sequence number,
wherein the first SN and the PN are located on different computing devices linked by a connection that dropped the third publisher message.

16. The system of claim of 15, further comprising:
a second SN configured to:
  receive the first publisher replay message, the first publisher replay message further comprising a set of future sequence numbers;
  retrieve a last received sequence number of the second SN;
  determine that the set of future sequence numbers comprises the last received sequence number of the second SN; and
  discard the first publisher replay message.

17. The system of claim 15, further comprising:
a second SN configured to:
  receive the first publisher replay message, the first publisher replay message further comprising a count of the set of publisher replay messages;
  generate a set of future sequence numbers based on the one-way function, the count, and the third sequence number;
  retrieve a last received sequence number of the second SN;
  determining that the set of future sequence numbers comprises the last received sequence number of the second SN; and
  discard the second publisher replay message.

* * * * *